March 7, 1950 W. R. TORN 2,500,141

INTERCOMMUNICATION SYSTEM

Filed Nov. 9, 1946 2 Sheets-Sheet 1

INVENTOR.
WILLIAM R. TORN

BY Robert L Kahn

March 7, 1950 W. R. TORN 2,500,141

INTERCOMMUNICATION SYSTEM

Filed Nov. 9, 1946 2 Sheets-Sheet 2

INVENTOR.
WILLIAM R. TORN

BY Robert L Kahn

Patented Mar. 7, 1950 2,500,141

UNITED STATES PATENT OFFICE 2,500,141

INTERCOMMUNICATION SYSTEM

William R. Torn, St. Charles, Ill., assignor to Operadio Manufacturing Company, St. Charles, Ill., a corporation of Illinois Application November 9, 1946, Serial No. 708,852

5 Claims. (Cl. 179—37)

Figure 1:
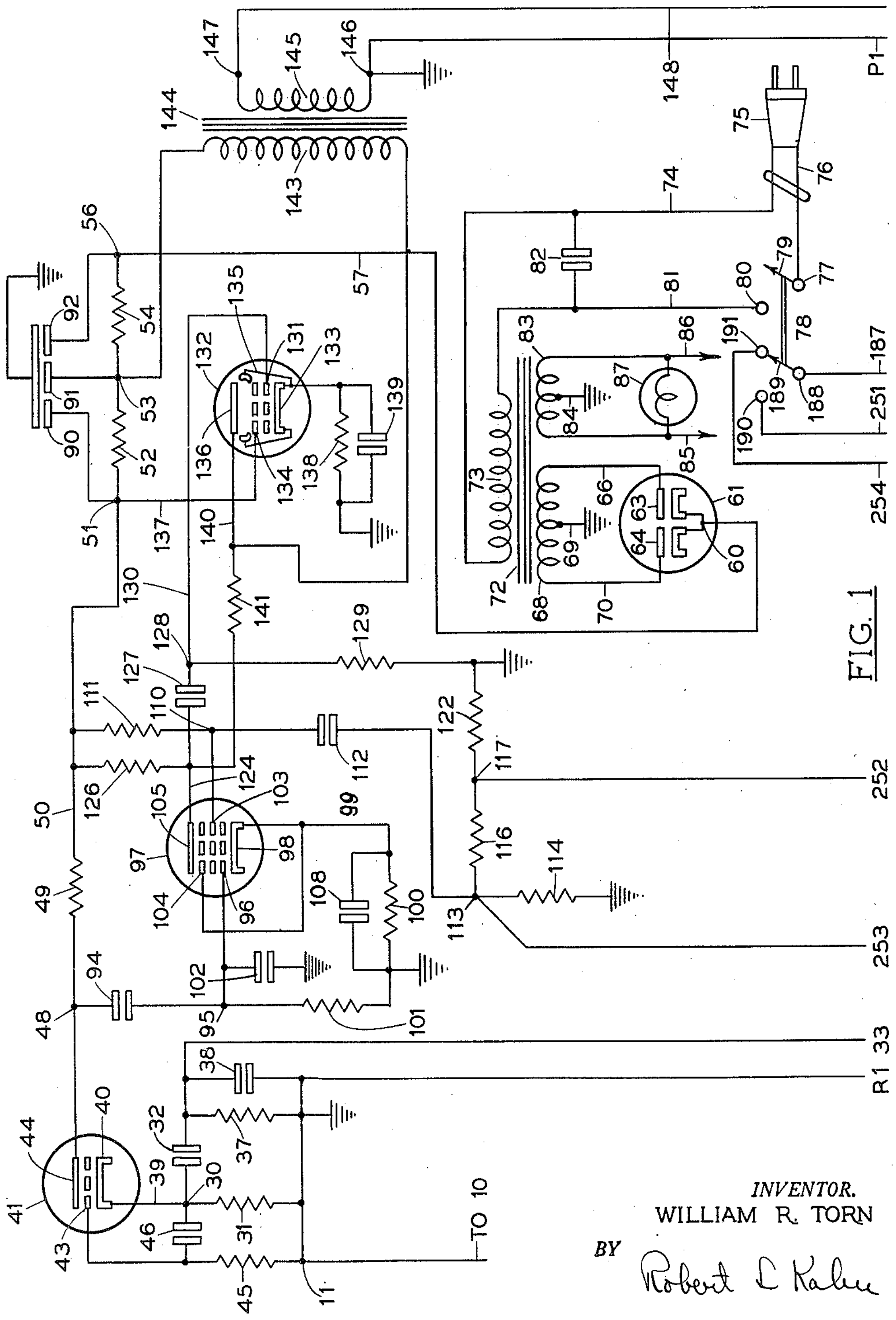

This invention relates to an electrical apparatus and particularly to an inter-communicating system useful for establishing communication among a number of stations.

Inter-communicating systems generally comprise one or more master stations and one or more remote stations, all inter-connected to form a system. It is possible to have all inter-connected stations as master stations, or a number of master stations and remote stations, or one master station and remote stations. As is well known in the art, a master station includes suitable amplifying means and switching means for selecting the called station or stations. A remote station generally consists of a transducer and a switch for changing from talking to receiving.

Such inter-communicating systems have come into substantial use. It has been found, however, that inter-communicating systems of the prior art lack flexibility to permit them to be adapted to various systems desired by customers. In most inter-communicating systems, it is possible for the originating station to connect one or more other stations for communication. Thus, the load on the originating master station may vary over wide limits. It has been found in systems of the prior art that such wide variation of load results in improper matching and results in wide variations of quality and volume. In such systems, one setting of a volume control at a master station may be satisfactory for one hook-up and be unsatisfactory for a different hook-up involving a different number of stations.

The above difficulty becomes important in view of the usual provisions for volume control in prior art inter-communicating systems. As a rule, only master stations have volume control. Thus, the volume at a remote station may be unsuitable for a particular setting of the volume control at a master station. Unless such other station is another master station with a volume control, such other remote station can do nothing except communicate this condition to the originating station.

It is frequently desirable to provide means in an inter-communicating system for transforming one or more stations into a high gain station supplied with a power speaker for paging purposes. The systems of the prior art do not provide simple means for accomplishing this.

A system embodying the present invention overcomes the preceding disadvantages and may be readily installed in an expeditious and economical manner. An inter-communicating system embodying the present invention has unusual flexibility permitting a composite communication system of master and remote stations as desired. Such a system provides means whereby the level of volume will remain substantially independent of the number of stations in communication at any one time. A system embodying the present invention permits a master station to adjust the volume level to a satisfactory value, which value will remain substantially constant under all conditions of use.

A system embodying the present invention has a further advantage of providing abnormally high gain at a station. The abnormally high gain may be used for paging.

A system embodying the present invention provides convenient circuits whereby prewired units may be installed to form a complete system independently of the number of master or remote stations. In systems of the prior art, this has generally required special wiring assemblies from the factory for a particular type of system. In distinction to this, a system embodying the present invention may have any number of master or remote stations to form a complete system up to the limit of the capacity of the system. The same prewired units, by a simple change, may have from one to the maximum number of master stations or mixed master and remote stations.

A system embodying the present invention has additional advantages in that a master station provides for a minimum number of circuit components. In particular, a system embodying the present invention relies upon cathode injection in distinction to the normal grid injection in a vacuum tube amplifier. By virtue of this, matching between a transducer and a vacuum tube is simplified and eliminates a matching transformer. This is particularly important since transformers in intercommunicating systems are susceptible to noise and power line pick-up unless precautions are taken to shield the transformer.

Figure 2:
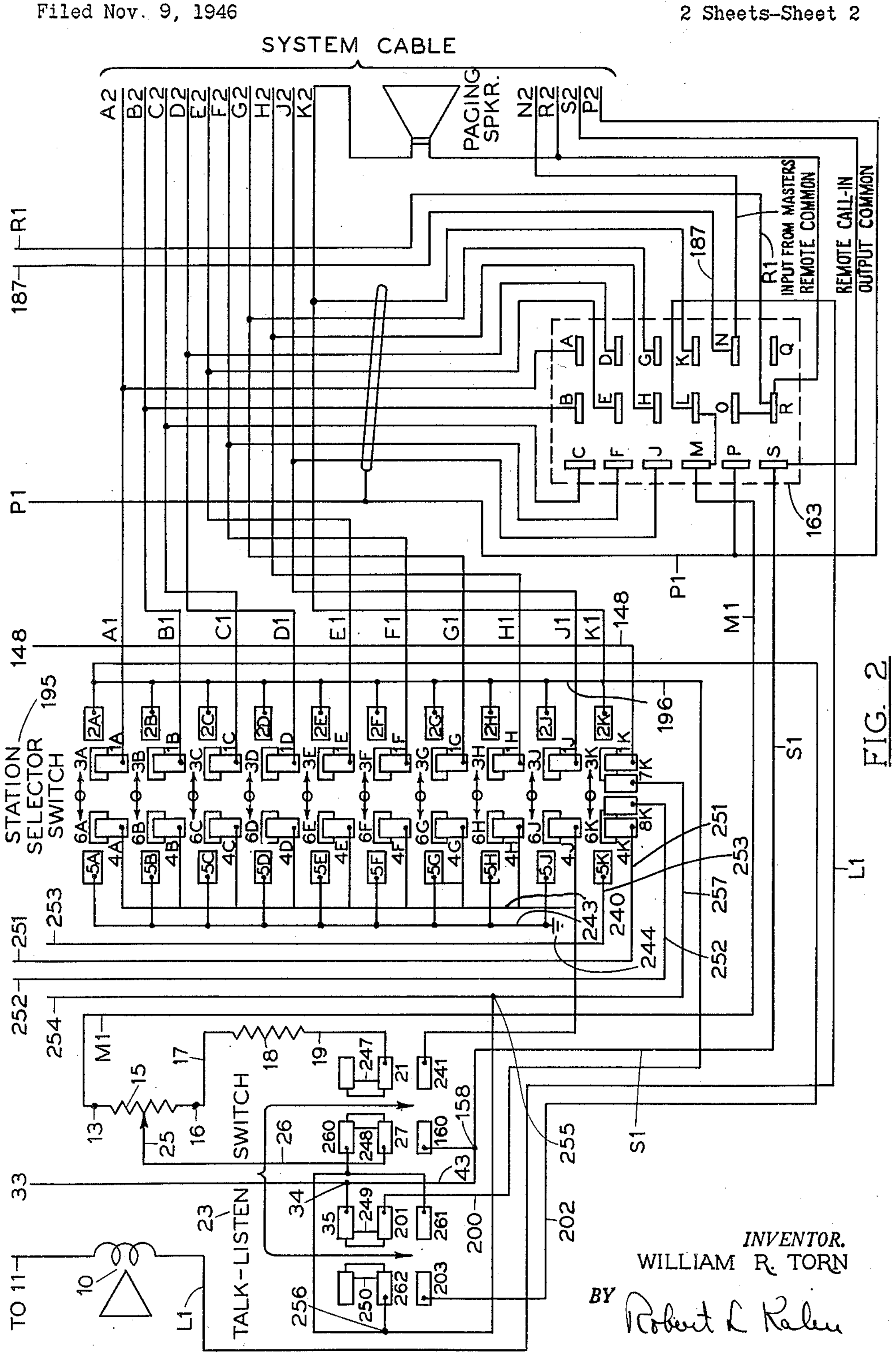

The drawings show a circuit diagram of a master station, Figure 1 being one portion of the circuit and Figure 2 being the remaining portion of the circuit.

Referring now to the master station, transducer 10 has one terminal connected to grounded junction 11. Transducer 10 may be any reversible loud speaker having sufficient sensitivity to be used as a microphone. Thus, a dynamic type of loud speaker with a permanent magnet field is generally used for this purpose. However, other types of translating devices may be used and, inasmuch as such devices are well known in the art, no detailed description thereof is deemed to be necessary.

Transducer 10 is connected through leads L1 and M1 to terminal 13 of resistor 15 having an impedance of the order of five or more times that of transducer 10. Resistor 15 has its other terminal 16 connected through wire 17 to resistor 18 having an impedance about equal to that of transducer 10 and thence, by wire 19, to switch contact 21 of a talk-listen switch assembly generally indicated by numeral 23.

Cooperating with resistor 15 is potentiometer wiper 25 connected through wire 26 to switch contact 27 of switch 23.

Grounded junction 11 has connected thereto ground wire R1. Between ground wire R1 and junction point 30 is connected resistor 31. Junction 30 is also connected through condenser 32 to wire 33 going to junction 34 and continuing to switch contact 35 of switch 23. Between wire 33 and ground wire R1 are connected resistor 37 and condenser 38 in parallel.

Junction 30 is connected by lead 39 to cathode 40 of amplifier 41. This amplifier may be a simple triode having cathode 40, control grid 43 and anode 44. Control grid 43 is connected through resistor 45 to ground. Condenser 46 is connected between the cathode and grid. Anode 44 is connected to junction 48, thence through resistor 49 and wire 50 to junction 51. Junction 51 has resistor 52 connected between it and junction 53, while resistor 54 is connected between junction 53 and junction 56. Junction 56 is connected by lead 57 to cathode 60 of full-wave rectifier 61. Rectifier 61 has anodes 63 and 64 respectively. Anode 63 is connected by lead 66 to one end terminal of transformer secondary 68 having grounded center tap 69. Anode 64 is connected by lead 70 to the other terminal of secondary 68. Transformer secondary 68 is one winding of power supply transformer 72 having primary 73. Primary 73 is connected by lead 74 to one pole of plug 75 for use in a conventional 110 volt, 60 cycle circuit. Plug 75 has its other pole connected by lead 76 to terminal 77 of power switch 78. Terminal 77 of switch 78 has movable contact 79 associated therewith, said contact being adapted to cooperate with fixed contact 80 connected by lead 81 to primary 73 of the power transformer. By-pass condenser 82 is connected across primary 73.

Power transformer 72 is provided with low voltage winding 83 having grounded center tap 84 and supply wires 85 and 86. Connected across wires 85 and 86 is indicating light 87 to show when the master station is on. Wires 85 and 86 are connected to the heaters of the various amplifier tubes for energizing the same.

Grounded filter condensers 90, 91 and 92 are connected respectively to junctions 51, 53 and 56. Referring to junction 48, the output of amplifier 41 is fed through blocking condenser 94 to junction 95, thence to control grid 96 of amplifier 97. Amplifier 97 has cathode 98 connected by lead 99 to grounded bias resistor 100. Junction 95 is also connected to grounded grid resistor 101 and grounded condenser 102. Amplifier 97 has accelerating grid 103, suppressor grid 104 and anode 105. Suppressor grid 104 is connected to lead 99 and to grounded by-pass condenser 108.

Accelerating grid 103 is connected to junction 110. Between junction 110 and lead 50 is resistor 111. Junction 110 is connected through blocking condenser 112 to junction 113. Junction 113 is connected through resistor 114 to ground and is also connected through resistor 116 to junction 117. Junction 117 is also connected to ground through resistor 122.

Anode 105 of amplifier 97 is connected by lead 124 and load resistor 126 to wire 50. Wire 124 is connected through blocking condenser 127 to junction 128, which point is connected to ground through resistor 129. Junction 128 is connected by lead 130 to control grid 131 of amplifier 132. Amplifier 132 is preferably of the type generally designated as power amplifiers for audio frequency systems and is capable of handling moderate amounts of audio frequency power. Thus, this amplifier may be of the so-called beam power type of which the 6V6GT is an example. Amplifier 132 has cathode 133, accelerating grid 134, beam control electrodes 135 and anode 136. Accelerating grid 134 is connected by wire 137 going to junction 51. Beam control electrodes 135 are maintained at any suitable potential such as by means of the cathode connection thereto. Cathode 133 is connected to ground by bias resistor 138 shunted by condenser 139. Anode 136 is connected to wire 140 which is connected by resistor 141 to lead 124. Wire 140 is connected to primary 143 of audio frequency output transformer 144. Primary 143 has its other terminal connected to junction 53. Audio frequency transformer 144 has secondary 145 whose one terminal 146 is grounded and whose other terminal 147 is connected to wire 148.

From junction 34 on wire 43, wire S1 goes to junction 158, from which point a connection is made to switch contact 160 of the talk-listen switch. From junction 158, wire S1 continues to contact S of distributing block 163. Distributing block 163 has contacts A to S inclusive of which contacts O, P and R are grounded. Contacts L and M are connected to complete the circuit between wires L1 and M1.

It is understood that the number of useful contacts on the distributing block will vary depending upon the capacity of the master station. In the system herein described, a total of ten stations may be served.

Contact N is connected by lead 187 to terminal 188 of switch 78. Terminal 188 has movable contact 189 cooperating with fixed contacts 190 and 191 respectively. As is clearly indicated in the drawing, switch 78 has movable contacts 79 and 189 tied together. When the 110 volt, 60 cycle circuit is open, as indicated in the drawing, by contact 79 being away from contact 80, then movable contact 189 is disposed against contact 191. When the 110 volt circuit is closed, movable contact 79 will touch fixed contact 80, while movable contact 189 will touch fixed contact 190. It is understood that movable contacts 79 and 189 are insulated from each other.

Contacts A to K inclusive are connected by wires A1 to K1 inclusive to station selector switch 195.

Station selector switch 195 has a series of fixed contacts 2A to 2K inclusive. The 2A to 2J series of contacts are normally connected together by wire 196. Wire 196, at the bottom end, is connected by lead 200 to switch contact 201 of the talk-listen switch. Wire 196 at the top end, is connected by wire 202 to contact 203 of talk-listen switch 23.

Station selector switch 195 has movable contacts 3A to 3K inclusive cooperating with the 1 and 2 series of contacts. Thus, each of the movable contacts may be moved to connect a pair of 1 and 2 contacts as desired. Station selector switch 195 also has a 4 series of fixed contacts 4A to 4K and a 5 series of contacts 5A to 5K respectively. Movable contacts 6A to 6K inclusive form a 6 series and are provided for cooperating between the 4 and 5 series of contacts.

The K portion of station selector switch 195 has additional fixed contacts 7K and 8K respectively. 7K is normally connected to 1K by movable contact 3K in the position as shown. Similarly, 8K is connected to 4K normally by movable contact 6K.

Station selector switch 195 is so arranged that a pair of movable contacts in the 3 and 6 series for the same letters are operated together to open or close contacts simultaneously in the 1, 2, 4 and 5 series. Thus, for example, movable contacts 3A and 6A are operated together so that contacts 1A and 2A are closed and 4A and 5A are closed simultaneously. The same is true of the remaining contacts.

When movable contacts 3K and 6K are simultaneously moved, the connection between 7K and 1K, on the one hand, is broken and the connection between 4K and 8K, on the other hand, is broken. With the movement of movable contacts 3K and 6K from the position shown, connections are established between 1K and 2K, on the one hand, and between 4K and 5K, on the other hand.

The 4 series of contacts from A to J inclusive are connected together by wire 240 going to contact 241 of talk-listen switch 23. The 5 series contacts from A to J inclusive are connected by wire 243 having bottom end 244 grounded.

Talk-listen switch 23 has movable contacts 247 to 250 inclusive. These movable contacts are all mechanically tied together as indicated by the arrows and are adapted to be moved as a unit and assume one of two positions. The position shown is a listening position. When moved to a talk position, all the movable contacts are moved downwardly as seen in the figure.

Contact 190 of power switch 78 is connected by wire 251 to fixed contact 4K of station selector switch 195. Fixed contact 8K is connected by wire 252 to junction 117. Contact 5K is connected by wire 253 to junction 113. Contact 191 of power switch 78 is connected by wire 254 to junctions 255 and 256. Junction 255 is connected by wire 257 to contact 7K of the station selector switch. Contact 1K is connected to wire 148 going to terminal 147 of output transformer secondary 145. Junction 256 is connected to contacts 260, 261 and 262 of talk-listen switch 23.

The master station disclosed herein is connected through a suitable cable going to the other stations in the system. Letters A to J inclusive indicate nine other stations in the system, while letter K represents a special station condition. It is, therefore, evident that a complete ten station system including the present station disclosed in detail is possible. Wires A2 to J2 inclusive will go from the corresponding contacts in distributing block 163. As is well known in this art, wire A2 for example will not necessarily be connected to the A contact of the distributing block of another master station.

In addition to wires A2 to J2 inclusive, wires N2, P2, R2 and S2 are provided. Wire N2 may be considered as a normal input from another master station. Wire R2 is the common return for remote stations. Wire P2 is the common return when this station is connected to some other master station. The other wire for the output would be any one or more of wires A2 to J2 inclusive.

It is understood that, with reference to the station disclosed herein, input conditions refer to circuit conditions when another station is calling this station, while output refers to circuit conditions when this station is calling another station. Wire S2 is provided in the event that a remote station is to originate a call to this station.

Station selector switch 195 is wired as shown in the drawing and is adapted for use in selecting one or more of nine stations in a ten-station system. As shown here, the wiring of selector switch 195 would call for all stations in the system to be master stations. However, it is not necessary that any of the other stations in the system be of the master type. In order to provide for a mixed master and remote station system, wires 196 and 243 may be cut along horizontally aligned points. The switches above the cut points will control master stations, and switches below the cut points will control remote stations. If three master stations, for example, are desired, wire 243 may be cut between connections 5C and 5D. Similarly, wire 196 should be cut between 2C and 2D.

The operation of the station here may be analyzed for conditions when power switch 78 is off and on. If power switch 78 is off, the station may receive calls only from other master stations in the system but cannot have any output, i. e. talk back. In that case, the output from another station will come through wire N2 into contact N of block 163. The circuit will continue through wire 187, switch point 188, switch blade 189, contact 191 along wire 254 to contact 260 of talk-listen switch 23. Assuming that the talk-listen switch is in the listening position as shown, the circuit will continue from contact 260 through movable contact 248 to fixed contact 27, then along wire 26 to wiper 25. From wiper 25, the circuit will continue through resistor 15 to terminal 13, through cable M1 to contact M, then to contact L and then to wire L1 through speaker 10 to junction 11. Junction 11 is a ground for the system and is connected to contact R of block 163. From contact R, wire R2 is the common return.

Now assume that power switch 78 is in the on position. An incoming call from another master station may be traced from wire N2 through wire 187 to switch point 188, then to switch point 190. From switch point 190, the circuit continuous through wire 251, to contacts 4K, 6K and 8K through wire 252 to junction 117. From junction 117, a voltage dividing network is provided for a purpose which will be explained later. Useful energy will continue from junction 117 through resistor 116 to junction 113. From junction 113, audio frequency potentials go through blocking condenser 112 to grid 103 of amplifier 97. The output of amplifier 97 goes from anode 105 along lead 124 through blocking condenser 127 to grid 131 of amplifier 132. The output of amplifier 132 is fed through to primary 143 of transformer 144. Secondary 145 feeds potentials to wire 148 to contact 1K. From contact 1K, the circuit continues through contacts 3K, 7K along wire 257 to junction 255 to junction 256 to contact 260 of talk-listen switch 23. From contact 260, the circuit continues through movable contact 248 to fixed contact 27 along wire 26 to wiper 25. From wiper 25, the circuit continues up resistor 15 to terminal 13, thence through wires M1 and L1 through speaker 10 and junction 11. From junction 11, the circuit goes to common return R2.

Still assuming that the power switch is on and that talk-listen switch 23 is now in the talk position, the circuit may now be traced as follows. Inasmuch as speaker 10 is the generator for the system, we may begin with junction 11 and go through speaker 10. The circuit continues through wires L1 and M1 to terminal 13, resistor 15 to wiper 25. From wiper 25, potentials are fed along wire 26 to fixed contact 27, thence through movable contact 248 to fixed contact 160. From contact 160, the circuit continues to junction 158, wire S1 to junction 34, then wire 33 to the network of resistors and condensers. Thus, potentials will be fed to the cathode of amplifier 41.

The output of amplifier 41 may be traced from anode 44 through blocking condenser 94 to control grid 96 of amplifier 97. The output of amplifier 97 goes from anode 105 through blocking condenser 127 to grid 131 of amplifier 132. Amplifier 132 feeds its output to primary 143 of transformer 144. Secondary 145 of this transformer feeds potentials to wire 148. From wire 148, the circuit continues through contacts 1K, 3K, 7K to wire 257, junctions 255 and 256 to contacts 261 and 203 of talk-listen switch 23.

It is necessary that the station selector button corresponding to the calling station be depressed. If a master station originates the call, then the circuit goes from contact 203 along wire 202 to the particular switch closed, say C for example. The circuit continues through 2C and 1C to wire C1, contact C on block 163 and then out along C2 to the calling station, through the calling station and back through output common wire P2 to ground.

If the calling station is a remote station, the output circuit goes from contact 261 to contact 201, wire 200 up to the proper switch, say G for example, through contacts 2G and 1G to wire G1 and contact G on block 163 and out on G2. The return is through common wire R2.

It should be understood that the input from any other master station is always from wire N2 through the master station as previously traced and back to R2. On the other hand, if the input is from a remote station, then upon operation of the station selector switch, the input will be through some other wire depending upon the particular station, such as for example J2 and back through R2. The input from a remote station originating a call may come in on line S2 providing that the station selector switch is in the position shown in the drawing. It is evident that, in this condition, the master station cannot talk back to the calling remote station but must select that calling station on station selector switch 195. Upon the operation of the station selector switch, both the input and output from this master station is on wire J2, for example, if that is the station calling and back on R2.

Upon operation of the K portion of the selector switch, the following changes are made. Thus, output transformer secondary 145 is connected to wire K1, the circuit going from terminal 147 through wire 148 to contact 1K, then through contact 3K to contact 2K. From wire K1, the circuit goes out to wire K2, then back through a common return. Wire K2 and the common return may feed a speaker having an unusually loud level of operation, such as might be required for paging. This speaker may, of course, be located in any desired spot. At the same time, resistor 116 is shunted out, the circuit running as follows: an input from N2 coming from another master station through wire 187 to contact 188, switch blade 189 to contact 190, wire 251 to contact 4K, contact 6K, contact 5K, wire 253 to junction 113.

Under normal conditions, another master providing input from line N2 is connected to junction 117. This makes resistor 122 a load for the master calling this station. Resistors 116 and 114 merely provide a voltage divider for reducing the level to the input of amplifier 97 to a desirable level. It should be noted that condenser 112 not only functions as a screen by-pass but also as a coupling condenser for the input of amplifier 97 when another master station is talking.

When a remote station is talking to the present master station, the input is to amplifier 41. It is, thus, evident that three stages of amplification are provided when this station is talking to another station or is listening to a remote station. Only two stages of amplification are provided at this station when this station is listening to another master station.

When another master station is calling this station for paging, the operation of the K switches results in the entire voltage appearing at input line N2 applied to junction 113 rather than a portion thereof as would normally be the case. Thus, input energy to two stages of amplification is provided at a higher than normal level thus resulting in output energy at transformer secondary 145 at an abnormally high level. In order to talk back from this station, it will be necessary to move the K switch to the position shown in the drawing and select the station calling.

When another master station is calling this station with power switch 78 in the off position, it should be noted that transducer 10 is in series with that portion of resistor 15 between terminal 13 and wiper 25. The remaining portion of resistor 15 to terminal 16 and resistor 18 is open. The same situation obtains when this station has power switch 78 on and is talking to another master station. It should be noted that ground 244 is cut off from wire 243 for master service. On the other hand, when this station is talking to a remote station, a ground is provided for resistor 18. Thus, from wiper 25, two shunt paths to ground are provided.

As has been pointed out previously, resistor 15 normally has a value high in comparison to that of 18 or transducer 10. Thus, as an example, transducer 10 may have an impedance of about 50 ohms and resistor 18 may have a resistance of about 50 ohms. Resistor 15 in that case may have a resistance of the order of about 400 ohms. Thus, when this station has its power switch off and is listening to another master station or with power on is listening to a remote station or with power on when this station is talking to another master station, the position of wiper 25 for controlling volume is not critical. However, when this station is talking to a remote station, the setting of wiper 25 is critical and will have a substantial effect on the signal level. In that case, resistor 18 is grounded so that the volume control is a shunt control in a relatively high impedance circuit.

Condenser 38 is to by-pass any radio frequencies or supersonic frequencies which may be picked up. Condenser 32 may be used to control frequencies by proper choice of value and also blocks any slow changes in potential across resistor 37 from bias resistor 31. Resistor 37 is merely a load to keep condenser 32 correctly polarized.

In the actual embodiment of the system, it has been found that grounds 146 and 11 may have some slight differences of audio frequency potential therebetween. In order to prevent cross-talk, the common returns R2 and P2 are provided. It is understood, however, that the two returns and the various grounds may be consolidated into one over-all ground.

What is claimed is:

1. In a master station for an intercommunication system, said master station including an audio-frequency amplifier having input and output terminals, a transducer adapted to function as a microphone or speaker, talk-listen switching means having talk and listen positions, a resistor having a resistance high in comparison to the transducer impedance having one terminal permanently connected to a transducer terminal, a wiper cooperating with said resistor for potentiometer action, connections from said wiper and free terminal of the resistor to said talk-listen switching means, connections from the amplifier input and output to said talk-listen switching means and free transducer terminal, said switching means connecting said transducer output to the amplifier input when in talking position or said transducer input to the amplifier output when in listening position, station selecting switching means and connections to other stations for communicating with other stations, certain of said other stations being of the master type with an active amplifier and remaining other stations being of the remote type without amplifiers, and connections between said station selecting switching means and talk-listen switching means and the free terminal of said resistor for shunting said resistor across said transducer only when said station is talking to another remote station and for leaving said free resistor terminal open at all other times whereby said wiper position is not critical at such all other times.

2. In a master station for an intercommunication system, said master station including an audio-frequency amplifier having input and output terminals, a transducer adapted to function as a microphone or speaker, talk-listen switching means having talk and listen positions, a resistor having a resistance high in comparison to the transducer impedance having one terminal permanently connected to a transducer terminal, a wiper cooperating with said resistor for potentiometer action, connections from said wiper and free terminal of the resistor to said talk-listen switching means, connections from the amplifier input and output to said talk-listen switching means and free transducer terminal, said switching means connecting said transducer output to the amplifier input when in talking position or said transducer input to the amplifier output when in listening position, station selecting switching means and connections to other stations for communicating with other stations, said station selecting switching means including an individual station switch for each of the other stations, a common lead for one side of each station switch, said common lead having one end open and the other end connected to the free transducer terminal, said common lead being adapted to be severed at any desired point between station switches so that station switches connected to one end of the common lead go to master stations with an active amplifier while station switches connected to the other end of the common lead go to remote stations without amplifiers and connections between said talk-listen switching means and the other side of said individual switches so that operation of switches corresponding to remote stations only shunt said resistor across said transducer only when said station is talking to another remote station and for leaving said free resistor terminal open at all other times whereby said wiper position is not critical at such all other times.

3. In a master station for an intercommunication system, said master station including an audio-frequency amplifier having at least two stages and input and output terminals for said amplifier and an interstage input, a transducer adapted to function as a microphone or speaker, talk-listen switching means having talk and listen positions, connections from said transducer to said talk-listen switching means, connections from the amplifier input and output and from the interstage input to said talk-listen switching means, station selecting switching means and connections to other stations for communicating with other stations, certain of said other stations being of the master type with an active amplifier and remaining other stations being of the remote type without amplifiers, said station selecting switching means including an individual switch for each of the other stations, a common wire for one side of each of the station switches, said common wire having both ends connected to the talk-listen switching means, said common wire being adapted to be severed at any desired point between station switches, the point of severance separating master from remote stations, said talk-listen switching means in the listening position connecting the remote station side of the common wire to the amplifier input and connecting the amplifier output to the transducer, said talk-listen switching means leaving the master station side of the common wire open in listening position, said connections from other master stations including said talk-listen switching means and a connection to said interstage input when said talk-listen switching means is in the listen position, said talk-listen switching means in talk position connecting the transducer output to the amplifier input and the amplifier output to said station selector switching means for distribution to other stations.

4. In a master station for an intercommunication system, said master station including an audio-frequency amplifier having at least two stages and input and output terminals for said amplifier and an interstage input, a transducer adapted to function as a microphone or speaker, a resistor having a resistance high in comparison to the transducer impedance having one terminal permanently connected to a transducer terminal, a wiper cooperating with said resistor for potentiometer action, talk-listen switching means having talk and listen positions, connections from said wiper and free terminal of the resistor to said talk-listen switching means, connections from the amplifier input and output and from the interstage input to said talk-listen switching means and free transducer terminal, station selecting switching means and connections to other stations for communicating with other stations, certain of said other stations being of the master type with an active amplifier and remaining other stations being of the remote type without amplifiers, said station selecting switching means including a pair of switches for each of the other stations, a common wire for one side of one of each pair of switches, said common wire having both ends connected to the talk-listen switching means, said common wire being adapted to be severed at any desired point between station switches, the point of severance separating master from remote stations, said talk-listen switching means in the listening position connecting the remote station side of the common wire to the amplifier input and connecting the amplifier output to the transducer, said talk-listen switching means leaving the master station side of the common wire open in listening position, said connections from other master stations including said talk-listen switching means and a connection to said interstage input when said talk-listen switching means is in the listen position, a common lead for one side of the other of each pair of station switches, said common lead having a master station end open and remote station end connected to the free transducer terminal, said common lead being adapted to be severed between switches corresponding to the same stations as in the common wire severance, and connections between said talk-listen switching means and the other side of the other of each pair of station switches for shunting said resistor across said transducer only when said station is talking to another remote station and for leaving said free resistor terminal open at all other times whereby said wiper position is not critical at such all other times.

5. The system of claim 1 wherein said amplifier is of the vacuum tube type with said tube having cathode, grid and anode electrodes and wherein the amplifier input is to the cathode.

WILLIAM R. TORN.

REFERENCES CITED

The following references are of record in the file of this patent:

UNITED STATES PATENTS

| Number | Name | Date |
|---|---|---|
| 2,054,933 | Frazier | Sept. 22, 1936 |
| 2,246,331 | White et al. | June 17, 1941 |
| 2,258,807 | Pitkin | Oct. 14, 1941 |
| 2,302,798 | Percival | Nov. 24, 1942 |
| 2,339,678 | Campbell | Jan. 18, 1944 |
| 2,377,672 | Campbell | June 5, 1945 |